United States Patent [19]

Budinger

[11] Patent Number: 5,384,337

[45] Date of Patent: Jan. 24, 1995

[54] POROMERIC MATERIAL HAVING UNIFORMLY DISTRIBUTED ELECTRETS FOR MAINTAINING AN ELECTROSTATIC CHARGE

[76] Inventor: William D. Budinger, 16 Southridge Dr., Kennett Square, Pa. 19348

[21] Appl. No.: 14,018

[22] Filed: Feb. 5, 1993

[51] Int. Cl.$^6$ .............................................. C08J 9/28
[52] U.S. Cl. ..................... 521/68; 528/129; 528/168; 528/169; 528/185; 528/191; 528/199; 528/240; 528/416; 521/50; 521/62; 521/65
[58] Field of Search .............. 529/129, 168, 169, 178, 529/185, 191, 199, 240, 416, 445; 521/50, 62, 65, 68

[56] References Cited

U.S. PATENT DOCUMENTS

| | | | |
|---|---|---|---|
| 3,067,483 | 12/1962 | Hollowell | 28/80 |
| 3,594,255 | 7/1971 | Budinger | 156/425 |
| 3,635,158 | 1/1972 | Budinger | 101/147 |
| 4,198,739 | 4/1980 | Budinger et al. | 29/132 |

Primary Examiner—Samuel A. Acquah
Attorney, Agent, or Firm—Panitch Schwarze Jacobs & Nadel

[57] ABSTRACT

A poromeric material for maintaining an electrostatic charge is provided, the material including a matrix of fibers, a polymeric binder for binding the matrix, and electrets present substantially uniformly throughout the poromeric material. Also provided are methods for making the poromeric material. In one embodiment, a polymeric binder mixture having electrets substantially uniformly contained therein is formed. The matrix of fibers is impregnated with the mixture and cured, whereby the electrets are substantially uniformly distributed throughout the matrix to produce the electrostatic poromeric material. In an alternative embodiment, the electrets are contained in the fibers of the matrix. The poromeric material may be used to encase a core to form a roller, for example, a hickey-removing roller.

13 Claims, 1 Drawing Sheet

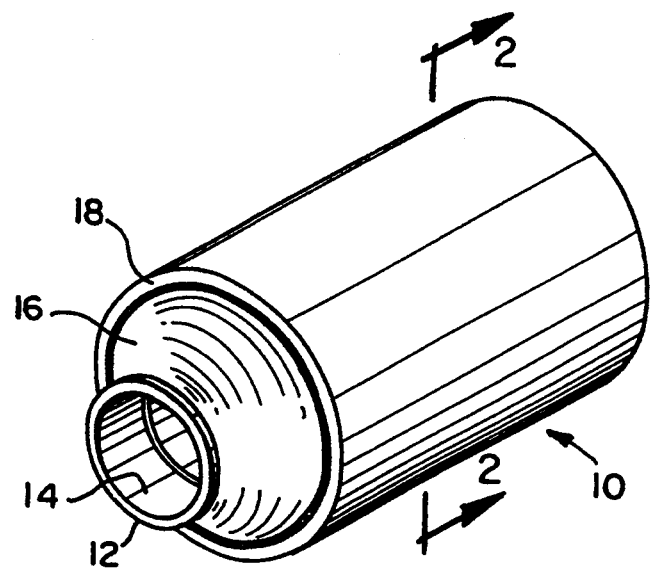
FIG. 1
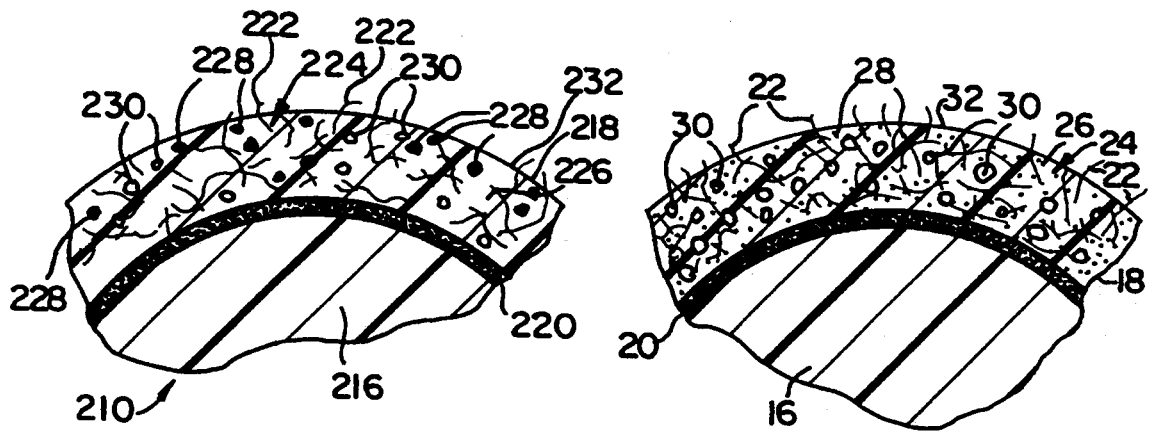
FIG. 4
PRIOR ART
FIG. 2
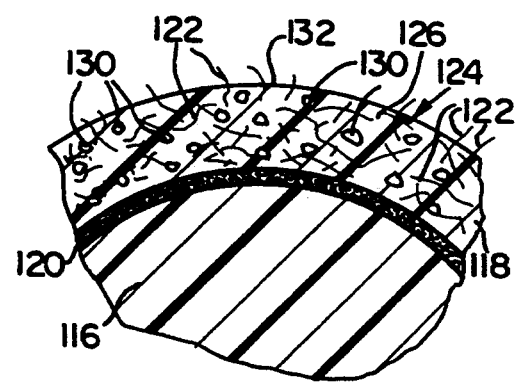
FIG. 3

POROMERIC MATERIAL HAVING UNIFORMLY DISTRIBUTED ELECTRETS FOR MAINTAINING AN ELECTROSTATIC CHARGE

FIELD OF THE INVENTION

The present invention relates to a poromeric material which may be included in a hickey-removing roller and methods of making the same and, more particularly, to such a poromeric material having uniformly distributed electrets for maintaining an electrostatic charge.

BACKGROUND OF THE INVENTION

Printer or hickey-removing rollers (sometimes referred to as "hickey picker" rollers) are used in the offset printing industry to remove foreign particles, such as dirt, bits of paper or dried ink, called "hickeys" or "fisheyes", from the printing plate and inking train. Early hickey-removing rollers consisted of a heavy leather sleeve fitted over a hard (80 Shore A durometer) rubber-covered roller core. However, leather rollers were expensive and often took several weeks to manufacture. In use, leather hickey-removing rollers were difficult to clean, frequently needed to have the cover re-tightened and, after prolonged use, would eventually harden and scratch the printing plates.

In the prior art, U.S. Pat. No. 3,594,255 discloses a poromeric hickey-removing roller comprising a sleeve of felted fibers impregnated with a binding agent, such as polyurethane or polyurea, encasing a resilient elastomer and an underlying hard core. The sheet of polymer-impregnated felted fibers may be bonded to the roller by a flexible epoxy adhesive. Polytetrafluoroethylene (PTFE) particles are deposited in the surface pores of the impregnated poromeric sleeve by immersing the roller in an aqueous dispersion of PTFE particles. The PTFE particles are believed to have a beneficial effect due to the influence of electrostatic fields created when the roller is in operation.

During the operation of a printing press, the hickey-removing roller, which is in contact with the printing plate, turns at a high rate of speed. As ink splits between the hickey-removing roller and the printing plate, a high level of static electricity is produced. If the hickey-removing roller contains a repository for this static charge, the roller becomes strongly charged with an electrostatic charge of polarity opposite to that of the plate. Since the hickey particles are adhered to the plate, the hickey particles have the same charge as the plate. Therefore, the hickey particles are repelled by the charge of the plate and attracted to the oppositely charged hickey-removing roller.

Electret materials, such as fluorocarbon particles capable of maintaining a high charge of static electricity even in an aqueous or semi-aqueous environment, are excellent repositories for maintaining a static charge. By incorporating electret materials in the hickey-removing roller, hickey particles may be removed from the printing plate by attraction to the electret-containing materials of the hickey-removing roller.

Such a hickey-removing roller is described in U.S. Pat. No. 3,594,255, where the PTFE particles are the electret material. However, the electret particles of the disclosed hickey-removing roller are not uniformly dispersed within the pores of the poromeric polymer impregnated fibrous matrix covering the roller. During the PTFE impregnation process, the particles are only capable of entering the pores exposed at the surface of the roller. The poromeric covering of the roller is relatively rich in electrets at its outer surface, but comparatively starved below the surface. As the outer surface of the roller is abraded or worn away, the electret-rich layer ablates away leaving a roller surface having relatively fewer electrets and decreased electrostatic capabilities.

Another drawback of typical prior art hickey-removing rollers is the pattern in which the electrets are distributed. Because the electret impregnation process is only capable of depositing electret particles in the pores, the particles tend to clump in relatively small volumes of the poromeric surface.

In contrast with the prior art, the improved poromeric material of the present invention has electrets present substantially uniformly throughout the material so that as the outer surface of the material is abraded, the concentration of electrets in the exposed surface is substantially the same as that of the outer surface which was abraded away, thereby providing essentially consistent electrostatic properties throughout the poromeric material.

DEFINITIONS

As used herein, the term "electret" means a substance capable of maintaining an electrostatic charge.

SUMMARY OF THE INVENTION

Briefly stated, one aspect of the present invention is a poromeric material capable of maintaining an electrostatic charge. The material comprises a matrix of fibers, a poromeric binder for binding the matrix and electrets present substantially uniformly throughout the poromeric material.

Another aspect of the present invention is a method for making such a poromeric material. According to the method, a polymeric binder mixture having electrets substantially uniformly contained therein is formed. The matrix of fibers is impregnated with the polymeric binder mixture. The impregnated matrix is cured, whereby the electrets are present substantially uniformly throughout the matrix to produce the electrostatic poromeric material.

In another aspect of the present invention, the fibers themselves comprise or contain electrets or electret material, such as PTFE.

Yet other aspects of the present invention are a roller and a method of making the same wherein the roller comprises a core, at least a portion of which is encased by the electrostatic poromeric material discussed above.

BRIEF DESCRIPTION OF THE DRAWINGS

FIG. 1 is a perspective view of a hickey-removing roller according to the present invention;

FIG. 2 is an enlarged cross-sectional view of the hickey-removing roller, taken along lines 2—2 of FIG. 1, showing a poromeric material of the present invention;

FIG. 3 is an enlarged cross-sectional view of the hickey-removing roller, taken along lines 2—2 of FIG. 1, showing an alternative embodiment of the poromeric material of the present invention; and FIG. 4 is an enlarged cross-sectional view of a typical prior art hickey-removing roller.

DETAILED DESCRIPTION OF THE PREFERRED EMBODIMENTS

The poromeric material of the present invention will now be discussed generally in the context of its use as a cover or outer layer for a hickey-removing roller for a printing press. However, the poromeric material of the present invention is not limited only to use as a hickey-removing roller cover, but is useful in other applications, such as a substitute for synthetic leather materials or especially in applications in which it is desired to maintain a static charge.

As best shown in FIG. 1, a printer or a hickey-removing roller, indicated generally at 10, comprises a core 12. The core 12 may be in the form of a solid shaft, if desired, or a longitudinal hollow tube 14 for being rotatably mounted upon a shaft of a printing apparatus (not shown). Whatever its form, the core 12 may be made of any rigid material, such as steel or aluminum.

The core 12 preferably is encased, at least partially, and preferably substantially entirely, about its longitudinal axis by a resilient sheath or layer 16, preferably having a Shore A durometer hardness of about 10 to about 40 and, more preferably, about 15 to about 30. Examples of suitable materials for the resilient layer 14 include Buna N rubber, neoprene, poly-2-chlorobutadiene and/or other natural and synthetic rubbers and elastomeric materials. The resilient layer 16 is typically vulcanized to the core 12, although the resilient layer 16 may be adhesively bonded to the core 12 or held by frictional forces, for example, by forming the resilient layer 16 with an inner diameter smaller than the outer diameter of the core 12 and forcing the resilient layer 16 over the core 12. The resilient layer is preferably ground to a diameter about 0.090 inch less than the diameter specified by the press manufacturer for the roller size to accommodate a hickey-removing roller cover, i.e., a layer 18 of the poromeric material of the present invention.

As best shown in FIG. 2, the layer 18 of poromeric material is secured to the resilient layer 16 by use of a suitable adhesive 20, such as any of the well known and commonly available rubber-bonding adhesives, such as a flexible epoxy adhesive. An example of a suitable flexible epoxy adhesive is made by mixing 60 parts by weight of a low molecular weight epichlorhydrin-bisphenol A condensate with 40 parts by weight of the polyamide condensation product of dimerized coconut oil acids with triethylene tetramine (equal parts) and 50 parts by weight of methyl ethyl ketone. A suitable epichlorhydrin-bisphenol A condensate is Epon 828 and a suitable polyamide condensate is curing agent V-25, both of which are commercially available from Shell Chemical Co. The surface of the resilient layer 16 is preferably wiped with a solvent, such as methyl ethyl ketone, acetone, or methylchloroform, prior to application of the adhesive 20.

The poromeric material of the present invention has electrets present substantially uniformly throughout the poromeric material to provide generally consistent electrostatic properties throughout the material. As best shown in FIG. 2, the layer 18 of poromeric material includes fibers 22. Preferably, the fibers 22 are formed from a polymer, such as polyester, polyamide, polyimide, polyestermide, PTFE and other polymers known to those of ordinary skill in the art. Preferably, in the embodiment shown in FIG. 2, the matrix 24 is formed from crinkled polyester fibers.

In an alternative embodiment best shown in FIG. 3, the fibers 122 themselves, rather than the binder, are formed from a material comprising electrets, and are substantially uniformly distributed throughout the fibrous matrix. In this embodiment, the fibers 22 preferably are formed from a polymer comprising an electret material or an electret-containing material, such as PTFE. In some applications, it may be undesirably expensive to use PTFE fibers and an alternative embodiment having the electrets present substantially uniformly within the microporous elastomer forming the poromeric binder may be preferred.

The fibers 22, 122 are securely felted together on a conventional needle loom to form a matrix, indicated generally at 24 in FIG. 2 and 124 in FIG. 3, to increase the structural integrity of the poromeric layer 18, 118. The fibers and their formation into a felted web or matrix may be as in U.S. Pat. Nos. 3,067,483 and 3,594,255, for example.

As presently preferred, the matrix 24, 124 is formed from fibers of about 6 denier per filament and about 1.5 inches in length, the matrix having a density of about 0.19 g/cc and a thickness of about 0.125 inches. The fibers 22, 122 may be crinkled by heat processing, with or without use of a solvent, mechanical curling, or by any other method well known to those of ordinary skill in the art. The cross-section of the fibers 22, 122 may be circular, elliptical, flat or crescent-shaped, as desired.

The matrix 24, 124 of fibers 22, 122 is impregnated with a microporous polymeric binder 26, 126 for binding the fibers 22, 122 within the matrix 24, 124. The polymeric binder 26, 126 preferably comprises a thermoplastic microporous polymer or copolymer. An example of a suitable thermoplastic polymer is polyurethane. While polyurethane is the presently preferred thermoplastic polymer, one of ordinary skill in the art would understand that any thermoplastic polymer capable of forming a microporous binder may be used in the present invention.

The polymeric binder 26, 126 may also comprise a liquid carrier, such as dimethylformamide (DMF), to facilitate impregnation of the fibrous matrix 24, 124. The liquid carrier is added to the polymeric binder 26, 126 to adjust the viscosity of the binder 26, 126 to facilitate penetration and saturation of the fibrous matrix 24, 124.

In the embodiment shown in FIG. 2, the polymeric binder 26 includes electrets present substantially uniformly throughout the binder 26, rather than within the fibers 22. In FIG. 2, the electrets are schematically represented by small dots 28 substantially uniformly throughout the binder 26. The electrets 28 may comprise discrete electret particles, such as polymeric particles, or may be electret functional groups chemically bonded to the polymer or copolymer forming the binder 26.

In one embodiment of the present invention, the electrets 28 are discrete fluorine-containing polymeric particles, such as PTFE, physically distributed substantially uniformly throughout the polymeric binder 26. The preferred PTFE particles have an average particle diameter of about 30 microns or less, and preferably considerably smaller, on the order of about 0.5 micron.

In an alternative embodiment of the present invention, the electrets comprise fluorine-containing functional groups grafted onto the polymer chain of the thermoplastic microporous polymeric binder 26. These functional groups are any that are capable of maintaining an electrostatic charge or imparting to the poromeric material the ability to maintain an electrostatic charge. For example, suitable fluorine-containing functional groups include fluorine-containing polyols, isocyanates or diamines used as reactants in making polyurethane, or difluorophenyl hydrazido groups, trifluoroanilino groups and mixtures thereof derived from reacting difluorophenyl hydrazine and trifluoroaniline with the polymer or reactants used to make the polymeric binder. One presently preferred example of electret functional groups are fluorine-containing groups derived from reacting a mixture of difluorophenyl hydrazine and trifluoroaniline in about a 4:1 weight ratio, with a polymer such as polytetramethylene ether glycol (PTMEG) dimerized with toluene diisocyanate. Other electret functional groups and other polymeric binders may be used, as desired.

Where the electrets 28 comprise fluorine-containing polymeric particles in the binder 26, it is presently preferred that the solids content of the polymeric binder 26 comprise about 20 wt % of the electret particles and thermoplastic polymer in a weight ratio of about 1.7:1 and about 80 wt % of the liquid carrier. The amount of electret particles in the binder 26 or fibers 122 must be sufficient to have enough particles uniformly distributed throughout the polymeric binder for the poromeric material's intended use. If the number of particles in the binder 26 is excessive, the binder 26 may be weakened, insufficiently viscous to evenly permeate the matrix 24 and/or difficult to coagulate. An appropriate balance is therefore necessary between providing a sufficient amount of electret particles for substantially uniform distribution throughout the binder to provide the desired electrostatic properties for the poromeric material, without adversely affecting the binding, impregnation or coagulation properties of the binder. Preferably about 10 to about 50 wt % of electret particles are uniformly blended and mixed with the polymeric binder as it is being formed.

The thermoplastic microporous polymer and electret-containing material may be mixed together and then added to the liquid carrier, or the thermoplastic microporous polymer and electret-containing material may be individually mixed with individual portions of the liquid carrier and then mixed together, as desired.

The layer 18 of poromeric material may be prepared according to the following methods. However, one of ordinary skill in the art would understand from the present disclosure that other methods may be used for making the poromeric material.

According to one method of the present invention, the poromeric material of the embodiment of FIG. 2 is made by forming a polymeric binder mixture having electret particles substantially uniformly contained therein, as set forth above. The matrix 24 of fibers is impregnated with the polymeric binder mixture by, for example, immersing or dipping the matrix 24 in the polymeric binder mixture to permit the mixture to penetrate and saturate the matrix 24.

The poromeric material of the alternative embodiment shown in FIG. 3 may be made by forming a polymeric binder mixture and impregnating a matrix 124 of the electret fibers or electret-containing fibers with the polymeric binder mixture.

The impregnated matrix 24, 124 is then cured to produce an electrostatic poromeric material containing electrets substantially uniformly throughout the poromeric material, regardless of the form of the electrets, whether discrete particles in the binder as in FIG. 2, electret functional groups chemically bonded to the binder or electret fibers as in FIG. 3. As presently preferred, the impregnated matrix 24, 124 is cured by immersing or dipping the matrix 24, 124 into a coagulation bath containing an aqueous solution of about 15 wt % dimethyl formamide (DMF). After about 1 hour of immersion, the polymeric binder 26, 126 will have uniformly coagulated into a microporous binder dispersed throughout the felt matrix 24, 124. One of ordinary skill in the art would understand that the length of time for coagulating the polymeric binder 26, 126 will vary based upon such variables as the types and relative amounts of the thermoplastic polymer, electret-containing material and liquid carrier chosen.

After the polymeric binder 26, 126 has cured, the resulting poromeric material may be washed with water to remove excess DMF and dried in a conventional oven. After drying, the surfaces of the poromeric material may be buffed or split to provide a layer 18, 118 of poromeric material which may be used, for example, as a hickey-removing roller cover.

The electrostatic poromeric material of the present invention is different in form and in effect than prior art electrostatic poromers. The differences are best explained with reference to FIG. 4, schematically representing, in a manner corresponding to FIGS. 2 and 3 of the present invention, an enlarged cross-section of a typical prior art hickey-removing roller, generally indicated as 210, such as may be made according to the teachings of U.S. Pat. No. 3,594,255. In the prior art roller 210 shown in FIG. 4, the electret particles 228 are not uniformly dispersed throughout the layer 218 including the fiber matrix 224, but are located only in voids or pores 230 adjacent to the outer surface 232 unevenly distributed throughout the binder 226 of the layer 218 of poromeric material. Pores 230 in the middle of the layer 218 and adjacent the resilient layer 216 are hollow and empty, signifying the inability of the electret particles of the prior art rollers to penetrate to that depth to fill the pores 230. Therefore, as the layer 218 adjacent to the outer surface 232 of the roller 210 of the prior art is abraded, the electrostatic properties of the layer 218 degrade as the concentration of electret particles 228 diminishes beneath the outer surface 232.

The layer 18 of poromeric material of the embodiment of the present invention shown in FIG. 2 has electret particles 28 or electret functional groups as part of the binder substantially uniformly throughout the layer 18 from the outer surface 32 to the inner surface adjacent the adhesive 20 and the resilient layer 16. The electret particles 28 or functional groups are not located only in the pores 30 as in the prior art (228 of FIG. 4), but, instead, they are incorporated in the polymeric binder as it is being formed. The microporous structure of the binder is not compromised by filling the pores at the outer surface 32 with particles. There is a substantially uniform concentration of electrets at any given depth of the layer 18. Consequently, as the layer 18 adjacent the outer surface 32 of the poromeric material is abraded, the electrostatic properties of the layer 18 remain fairly consistent throughout. Moreover, where the electrets of FIG. 2 are in the form of discrete particles there is the opportunity to have considerably more electret particles in the present invention, since they are not restricted to the pores as in the prior art poromers of FIG. 4.

Similarly, the layer 118 of poromeric material of the embodiment of the present invention shown in FIG. 3 has electret fibers 122 substantially uniformly distributed throughout the layer 118 because the fibers 122 comprising the matrix 124 are substantially uniformly distributed throughout the layer 118. Therefore, as the layer 118 adjacent the outer surface 132 of the poromeric material is abraded, the electrostatic properties of the layer 118 remain fairly uniform throughout.

Non-limiting examples of poromeric materials prepared according to the present invention are set forth below in Examples I and II. Example I relates to a poromer containing a substantially uniform distribution of electret particles.

EXAMPLE I

Crinkled polyester fibers of about 6 denier per filament and about 1.5 inches in length were felted on a conventional needle loom to a density of about 0.19 g/cc and a thickness of about 0.125 inches to form a matrix of fibers. A solid mixture was formed from 7.45 wt % Estane 5707 polyurethane powder (commercially available from B. F. Goodrich Co.) and 12.55 wt % electret particles in the form of PTFE powder (Teflon®, commercially available from E. I. dupont de Nemours & Co.). The average particle diameter of the PTFE particles was about 0.5 microns. Twenty wt % of this solid mixture was mixed with DMF, and blended until smooth to form a polymeric binder mixture.

The fibrous matrix was immersed in the polymeric binder solution until the fibrous matrix was saturated. The saturated fibrous matrix was removed from the binder solution and immersed in a coagulation bath containing an aqueous solution of 15 wt % DMF for about 1 hour, to form a microporous binder having the electret particles distributed substantially uniformly throughout the fibrous matrix. The product was then washed to remove remaining DMF and then dried in a conventional oven. An electrostatic microporous poromeric material resulted. After drying, the skin surfaces of the poromer are removed by buffing or splitting, so that a poromeric material about 0.10 inch thick is formed.

In an alternative embodiment of the present invention, the electrets comprise fluorine-containing functional groups grafted onto a polymer of the polymeric binder. An example of a polymeric binder having fluorine-containing functional groups is set forth below in Example II.

EXAMPLE II

A thermoplastic microporous polymeric binder impregnant according to the present invention was made by forming a first mixture (Mixture A) by mixing 64.3 kilograms of 1000 molecular weight PTMEG (Taracol ™ 1000, which is commercially available from dupont) with 5.7 kilograms of toluene diisocyanate. This mixture was stirred at a temperature of 90° C. for 3 hours. After 3 hours, 16.2 kilograms of methylene di-para-phenylene isocyanate was added to the mixture and stirred for another two hours at the same temperature. To this mixture was added 245 kilograms of DMF and the resulting solution was cooled to a temperature of 25° C.

An electret-containing mixture (Mixture B) was formed by mixing 4.0 kilograms of 2,5-difluorophenyl hydrazine and 1.0 kilogram of 2,3,4-trifluoroaniline in 30 grams of DMF at room temperature. A third mixture (Mixture C) was formed from 30 kilograms of polyvinyl chloride resin (BR350, which is commercially available from Oxychem, Inc. of Houston, Tex.) dissolved in 183 kilograms of DMF.

Mixtures A and B were mixed together, and Mixture C was added to the resulting mixture to form a polymeric binder solution of the present invention, where the fluorine-containing electret functional groups derived from the 2,5-difluorophenyl hydrazine and 2,3,4-trifluoroaniline reactants were grafted onto the polymer chain of the urethane-polyvinyl chloride copolymer.

A fibrous matrix of the same material as that used in Example I above was immersed in the polymeric binder impregnant made according to this Example II and coagulated, washed, dried and treated in a manner similar to that set forth in Example I above.

Another aspect of the present invention is a method for making the hickey-removing roller 10, shown in FIGS. 1, 2 and 3, as discussed above. As presently preferred, the core 12 is encased by the resilient layer 16 described above. The outer surface of the resilient layer is coated with an adhesive 20 also as described above.

A layer 18 is formed using an embodiment of the electrostatic poromeric materials discussed in detail above, in either Examples I and II, for instance. As presently preferred, the layer 18 of poromeric material for use as a hickey-removing roller cover is about 0.10 inch thick, although it could be as thick as desired for any given operation. The poromeric material may be cut into rolls (e.g., 50 feet of material per roll) having a width about two times the diameter of the roller 10. The layer 18 is wrapped to encase at least a portion, and preferably all, of the core 12 with the poromeric material. The layer 18 of poromeric material is helically wrapped around the resilient layer 16 such that adjacent helical strip edges are butted tightly together. The assembled roller 10 may be cured in an oven at 180° F. for about 24 hours.

If desired, the poromeric material of the layer 18 may be impregnated with a soft elastomer, such as polyurethane or polyurea to fill any surface pores or seams that may exist between the butted edges of the wrapped poromeric material. Suitable roller assembly and impregnation processes are described in U.S. Pat. No. 3,594,255.

The assembled roller 10 is ground to the desired size. The nap on the outer surface 32 of the layer 18 of the poromeric material is raised, for example, by placing the roller 10 on a lathe, wetting the roller 10 with mineral spirits, and sanding the layer 18 while wet with No. 80 grit garnet paper. The improved poromeric material of the present invention is softer than typical prior art hickey-removing roller covers and tends to have a more uniform nap.

One of ordinary skill in the art would understand from the present disclosure that other methods may be used for making a hickey-removing roller of the present invention.

It will appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A poromeric material for maintaining an electrostatic charge, the poromeric material having a thickness, length and width, the material comprising a matrix of fibers, a polymeric binder for binding the matrix, and electrets present substantially uniformly as part of the polymeric binder throughout the thickness, length and width of the poromeric material to provide a concentration of electrets that is substantially uniform regardless of wear of the poromeric material.

2. The poromeric material according to claim 1, wherein the fibers comprise a polymer.

3. The poromeric material according to claim 2, wherein the polymer is selected from the group consisting of polytetrafluoroethylene, polyester, polyamide, polyimide, and polyesteramide.

4. The poromeric material according to claim 1, wherein the electrets are discrete electret particles physically distributed substantially uniformly throughout the binder.

5. The poromeric material according to claim 4, wherein the electret particles comprise polymeric particles.

6. The poromeric material according to claim 4, wherein the electret particles comprise fluorine-containing polymers.

7. The poromeric material according to claim 6, wherein the electret particles comprise polytetrafluoroethylene.

8. The poromeric material according to claim 1, wherein the electrets comprise fluorine-containing, electrostatic charge maintain functional groups on a polymer of the polymeric binder.

9. The poromeric material according to claim 8, wherein the fluorine-containing functional groups are selected from the group consisting of difluorophenyl hydrazido groups, trifluoroanilino groups and mixtures thereof.

10. The poromeric material according to claim 4, wherein the electret particles are present in an amount of about 10 to about 50 weight percent of the polymeric binder.

11. The poromeric material according to claim 4, wherein the electret-containing polymeric binder comprises components have a solids content of about 20 weight percent of a combination of the electret particles and a thermoplastic polymeric binder in a weight ratio of about 1.7:1, and about 80 weight percent of a liquid carrier for the polymeric binder.

12. The poromeric material according to claim 4, wherein the electret particles have an average particle diameter of less than or equal to about 30 microns.

13. The poromeric material according to claim 12, wherein the electret particles have an average particle diameter of about 0.5 micron.

* * * * *